(12) United States Patent
Campbell

(10) Patent No.: US 10,113,296 B2
(45) Date of Patent: Oct. 30, 2018

(54) DRAGLINE BUCKET RIGGING SYSTEM

(71) Applicant: Richard V Campbell, Havana, FL (US)

(72) Inventor: Richard V Campbell, Havana, FL (US)

(73) Assignee: Bright Technologies, L.L.C., Havana, FL (US)

(*) Notice: Subject to any disclaimer, the term of this patent is extended or adjusted under 35 U.S.C. 154(b) by 103 days.

(21) Appl. No.: 15/066,162

(22) Filed: Mar. 10, 2016

(65) Prior Publication Data

US 2016/0186407 A1 Jun. 30, 2016

Related U.S. Application Data

(63) Continuation-in-part of application No. 14/043,333, filed on Oct. 1, 2013.

(51) Int. Cl.
*E02F 3/60* (2006.01)
*E02F 3/48* (2006.01)
(Continued)

(52) U.S. Cl.
CPC ............ *E02F 3/60* (2013.01); *D07B 1/18* (2013.01); *E02F 3/48* (2013.01); *E02F 9/2016* (2013.01); *F16G 11/042* (2013.01); *F16G 13/12* (2013.01); *D07B 2201/209* (2013.01); *D07B 2201/2074* (2013.01); *D07B 2201/2089* (2013.01); *D07B 2201/2092* (2013.01); *D07B 2201/2095* (2013.01); *D07B 2201/20903* (2015.07); *D07B 2401/206* (2013.01); *D07B 2501/2015* (2013.01)

(58) Field of Classification Search
CPC ...... E02F 3/48; E02F 3/56; E02F 3/60; D07B 2201/20903; D07B 2201/2074; D07B 2201/2089; D07B 2201/209; D07B 2201/2092; D07B 2201/2095; D07B 1/16; D07B 1/025; F16G 11/00; F16G 11/04; F16G 11/042; F16G 13/12
See application file for complete search history.

(56) References Cited

U.S. PATENT DOCUMENTS 3,660,887 A * 5/1972 Davis ................. B29C 39/10
174/176
3,698,749 A * 10/1972 Yonkers .............. E04C 5/122
174/177

(Continued)

*Primary Examiner* — Jessica H Lutz
(74) *Attorney, Agent, or Firm* — J. Wiley Horton

(57) ABSTRACT

An assembly and method for using a flexible tensile member as part of the rigging for a dragline bucket. The tensile member includes a stranded core surrounded by a separate armor layer. The armor layer assumes the form of a hollow cylinder having a substantial wall thickness. A significant gap is provided between the outward-facing surface of the stranded core and the inward-facing surface of the armor layer. This gap minimizes wear between the two elements during the normal bending and flexing of the tensile member. A first anchor is attached to a first end of the stranded core and a second anchor is attached to a second end of the stranded core. These anchors serve to transmit tension carried by the stranded core. A first end of the armor layer is also attached to the first anchor and a second end of the armor layer is attached to the second anchor.

16 Claims, 28 Drawing Sheets

(51) Int. Cl.
*E02F 9/20* (2006.01)
*D07B 1/18* (2006.01)
*F16G 11/04* (2006.01)
*F16G 13/12* (2006.01)

(56) References Cited

U.S. PATENT DOCUMENTS

| | | | | |
|---|---|---|---|---|
| 3,739,457 | A * | 6/1973 | Davis | B29C 39/10 174/176 |
| 4,184,784 | A * | 1/1980 | Killian | F16G 11/05 24/122.6 |
| 4,329,794 | A * | 5/1982 | Rogers | E02F 3/60 37/398 |
| 4,864,747 | A * | 9/1989 | Martin | E02F 3/60 37/399 |
| 5,140,761 | A * | 8/1992 | Coffman | E02F 3/58 24/129 A |
| 5,718,532 | A * | 2/1998 | Mower | B29C 70/76 403/265 |
| 5,865,557 | A * | 2/1999 | Kasim | E02F 3/58 403/157 |
| 6,164,053 | A * | 12/2000 | O'Donnell | B66B 7/06 187/251 |
| 6,272,775 | B1 * | 8/2001 | Schmidt | E02F 3/58 37/399 |
| 6,581,995 | B1 * | 6/2003 | Zaayman | B66C 1/12 294/68.3 |
| 7,076,853 | B2 * | 7/2006 | Campbell | F16G 11/042 29/458 |
| 7,389,633 | B2 * | 6/2008 | Misrachi | D07B 1/165 57/223 |
| 7,404,426 | B2 * | 7/2008 | Akiyama | D02G 3/48 152/451 |
| 7,669,294 | B2 * | 3/2010 | Campbell | F16G 11/042 24/122.3 |
| 7,682,274 | B2 * | 3/2010 | Akiyama | D02G 3/187 428/375 |
| 7,818,849 | B2 * | 10/2010 | Campbell | H02G 15/068 24/122.6 |
| 8,176,719 | B2 * | 5/2012 | Furusawa | D02G 3/447 57/225 |
| 8,215,886 | B2 * | 7/2012 | Campbell | F16G 11/05 411/383 |
| 9,573,661 | B1 * | 2/2017 | Plaia | B63B 21/20 |
| 2003/0089551 | A1 * | 5/2003 | Kato | B66B 7/06 182/1 |
| 2005/0204555 | A1 * | 9/2005 | Campbell | F16G 11/042 29/874 |
| 2005/0208829 | A1 * | 9/2005 | Campbell | H01R 13/40 439/587 |
| 2006/0096089 | A1 * | 5/2006 | Campbell | F16G 11/042 29/857 |
| 2006/0160435 | A1 * | 7/2006 | Campbell | F16G 11/025 439/878 |
| 2007/0020072 | A1 * | 1/2007 | Huffman | E02F 3/48 414/462 |
| 2007/0036497 | A1 * | 2/2007 | Craig | G02B 6/4429 385/107 |
| 2008/0314016 | A1 * | 12/2008 | Itaya | D07B 1/0673 57/210 |
| 2009/0136291 | A1 * | 5/2009 | McClanahan | E02F 3/58 403/156 |
| 2009/0183397 | A1 * | 7/2009 | Kubo | E02F 3/60 37/399 |
| 2011/0067220 | A1 * | 3/2011 | Campbell | F16G 11/042 29/428 |
| 2011/0110708 | A1 * | 5/2011 | Miotke | E02F 3/58 403/64 |
| 2012/0102679 | A1 * | 5/2012 | Doan | E02F 3/58 24/115 R |
| 2012/0160082 | A1 * | 6/2012 | Erlendsson | D04C 1/12 87/6 |
| 2013/0047410 | A1 * | 2/2013 | Campbell | F16G 15/06 29/525.01 |
| 2013/0047572 | A1 * | 2/2013 | Morgan | B21D 39/04 57/200 |
| 2013/0086824 | A1 * | 4/2013 | Chou | E02F 3/48 37/399 |
| 2014/0090279 | A1 * | 4/2014 | Campbell | E02F 3/48 37/399 |
| 2014/0137388 | A1 * | 5/2014 | Campbell | F16G 11/025 29/461 |
| 2014/0260174 | A1 * | 9/2014 | Cavallin | D07B 1/0686 57/215 |
| 2014/0338168 | A1 * | 11/2014 | Campbell | F16G 11/025 29/426.2 |

* cited by examiner

DRAGLINE BUCKET RIGGING SYSTEM

CROSS-REFERENCES TO RELATED APPLICATIONS

This non-provisional patent application is a continuation-in-part of U.S. patent application Ser. No. 14/043,333. This application lists the same inventor as the parent application.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of mining and excavation equipment. More specifically, the invention comprises an improved rigging system for dragline buckets that reduces the need for heavy chains.

2. Description of the Related Art

In order to understand the significance of the present invention, it is important to have some understanding of conventional dragline bucket rigging. FIG. 1 shows dragline bucket assembly 10. As those skilled in the art will know, the dragline bucket assembly is lifted and positioned by a boom crane—typically a very large boom crane. Bucket 24 is nearly always made of thick steel. The width of the bucket's mouth may be as much as twenty feet (6 meters). The bucket itself often weighs many tons.

In operation, the bucket is swung into position and then dropped into the material that is to be removed. The mouth of the bucket is typically given a downward pitch during the drop operation so that it digs into the material. The bucket is then dragged back toward the boom crane. As it is dragged along the bucket's mouth scoops in a load of material. FIG. 1 shows the configuration of the dragline bucket assembly during a typical scooping phase.

Once the bucket is full the boom crane is used to pull the bucket assembly free of the material. The boom crane then swings the bucket toward the area where the scooped material is to be deposited. When the bucket assembly reaches the deposit area, a dumping mechanism causes the bucket to pitch downward. The contents of the bucket then spill from the bucket's mouth. Once the bucket is empty, the cycle repeats.

Bucket 24 and its contents are primarily suspended by a pair of lift trunnion assemblies 22—with a trunnion assembly being located on each side of the bucket. A lower hoist chain 20 connects each trunnion to spreader bar 18. An upper hoist chain 16 connects each side of the spreader bar to yoke 48.

The term "yoke" refers to the component that connects the upper hoist chains to the tensile members used to lift the entire bucket assembly. It is also typically used to connect the chains to the dump block assembly. It can take on many shapes and forms. In the example of FIG. 1, yoke 48 connects upper hoist chains 16 to a pair of lift ropes 14 (Each lift rope 14 is connected to a socket 12). In this context the term "rope" refers to any suitably flexible tensile member. A cable made of wrapped steel wires is often used as a lift rope.

The yoke may be a single large casting or it may be an assembly of several pieces. The term should be broadly construed to mean anything that connects the bucket assembly rigging to the lifting cables leading to the boom on the crane.

As stated previously, the lift ropes connect the bucket assembly to the boom of the crane. Yoke 48 also provides an attachment point for dump block 28. As the name suggests, a mechanism incorporating the dump block is used to change the bucket from its scooping configuration to its dumping configuration. When this mechanism is actuated, the bucket pivots downward about the two trunnion assemblies. The mouth of the bucket pitches downward and the tail of the bucket rises. Once the bucket's contents are completely dumped, the dumping mechanism is reversed and the bucket is returned to its digging orientation.

Still referring to FIG. 1, one or more drag lines 36 are attached to the rigging shown via drag socket 34. A drag line(s) is used to pull the bucket toward the crane once the bucket has been dropped into the material. A drag line is also commonly used to regulate the bucket's orientation. Drag chains 30 connect drag socket 34 to the sides of the bucket. The drag chains attach to bucket 24 on either side of the bucket's mouth. Arch 32 is typically provided to reinforce the bucket's open mouth.

The reader will note that a dump rope 26 passes from the drag socket 34, around dump block 28 and connects to the upper portion of arch 32. The dump rope is used to regulate the transition of the bucket between its digging and dumping orientations.

FIG. 2 shows the same assembly from a different vantage point. The reader will note that each drag chain is attached to the bucket using a large and robust drag chain hitch 40. The lifting chains may be divided into two categories: Lower hoist assembly 44 includes the two lifting chains connecting the trunnions to the spreader bar. The spreader bar itself may also be considered part of the lower hoist assembly. Upper hoist assembly 42 includes the lifting chains used to connect the spreader bar to the yoke. Top rail 38 extends around the top of the open bucket.

The bucket assembly is operated in a brutal environment. The bucket is typically dropped into an ore deposit containing rocks and other abrasive materials. Chains have traditionally been used near the bucket itself because of the extreme forces applied and the abrasive action of the material being dug. The chains shown in the assembly may be comparable in size to the termination chains used on a large ship. For example, each link may be well in excess of 1 foot (30+ centimeters) long.

Such chains are quite heavy. They must be serviced and replaced quite often as well. The size and weight of the chains make them difficult and dangerous to handle. In addition, the chains rapidly elongate while in use—primarily because of link-to-link abrasion. This elongation alters the dumping geometry of the bucket assembly and reduces its performance. In addition, the elongation of the lifting chains reduces the maximum height to which the bucket assembly may be lifted. The reduction in lift height reduces the amount of material that the dragline assembly can move. It would be advantageous to replace the chains with a lighter and less cumbersome material. It would also be advantageous to replace the chains with a tensile member that does not elongate significantly.

FIG. 3 shows a proposed replacement of the chains used in the upper hoist assembly. A pair of flexible tensile members 46 have been substituted for the chains used in the prior art. Chains are still used in the lower hoist assembly— since these components are subjected to the dropping and dragging operations of the bucket itself. It is likely that only a chain can be used in the lower hoist assembly as no other component is able to survive that environment, though it may ultimately be possible to use the present invention for the lower hoist components as well.

The reader will note that the cables used are free of the actual dropping and dragging operations—being above spreader bar 18. FIG. 5 shows a section view through the assembly that illustrates the position of the tensile members 46 compared to lower hoist assembly 44. Spreader bar 18 is needed to prevent the lower chains dragging along the side of the bucket and binding the dumping operations. However, above the rigid spreader bar, a more flexible tensile member may be used and one might therefore assume that the assembly of FIG. 3 provides a workable solution. Another problem exists, however.

A dragline bucket assembly must be periodically laid on the ground for servicing, shift changes, or other reasons. When the bucket assembly is placed on the ground and the boom is lowered, the lifting rigging falls over the bucket in random and unpredictable ways. FIG. 4 provides a detailed view of the upper and lower hoist assemblies when the bucket has been placed on the ground.

Tensile member 46 is flexible enough to lay across top rail 38 as shown. Spreader bar 18 and dump block 28 have both fallen on top of tensile member 46 and "pinched" it against top rail 38. Tensile member 46 may also be dragged along top rail 38 while being subjected to other forces. The spreader bar may weigh several tons and even the dump block assembly may exceed one ton in weight. Thus, the reader will perceive that even though tensile member 46 lies above the dropping and digging operations it is still subjected to extreme battering, bending, cutting, and compression forces when the bucket is laid down. Further, the orientation of the "pile" of heavy components created when the bucket is laid down is random and impossible to consistently predict.

Thus, even though it is possible to use a flexible tensile member in the upper hoist assembly, a conventional flexible tensile member is not likely to survive the full range of bucket operations. Some flexible designs have been evaluated over the years but no such design has ever been able to successfully compete with chain.

The advantages of using such a tensile member are promising, however. Any reduction in the weight of the bucket rigging means that a larger bucket can be used (for a given crane lifting capacity) and more fill material can be carried with each scoop. Any reduction in the stretching tendency of the tensile members used means that the assembly produces a more consistent bucket fill and soil mound height, thus increasing productivity. Any reduction in metal-to-metal wear increases the lifespan of a component and reduces the frequency of component replacement. Any reduction in the use of chain reduces the safety hazards inherent in the use of chain. Thus, a new type of flexible tensile member assembly that is able to withstand all the dragline bucket operations would be advantageous. A new type of flexible tensile member assembly that is able to employ modern synthetic materials would further reduce the weight of the rigging and provide an even greater advantage.

BRIEF SUMMARY OF THE PRESENT INVENTION

The present invention comprises an assembly and method for using a flexible tensile member as part of the rigging for a dragline bucket. The tensile member includes a stranded core surrounded by a separate armor layer. The armor layer assumes the form of a hollow cylinder having a substantial wall thickness. The stranded core produces excellent strength in tension. The armor layer protects the stranded core from external blows and forces produced by the weight of the other parts of the bucket rigging and the hostile environment in which the bucket operates. A significant gap is provided between the outward-facing surface of the stranded core and the inward-facing surface of the armor layer. This gap minimizes wear between the two elements during the normal bending and flexing of the tensile member.

A first anchor is attached to a first end of the stranded core and a second anchor is attached to a second end of the stranded core. These anchors serve to transmit tension carried by the stranded core. A first end of the armor layer is also attached to the first anchor and a second end of the armor layer is attached to the second anchor.

REFERENCE NUMERALS IN THE DRAWINGS

| 10 | dragline bucket assembly | 12 | hoist socket |
| 14 | lift rope | 16 | upper hoist chain |
| 18 | spreader bar | 20 | lower hoist chain |
| 22 | lift trunnion assembly | 24 | bucket |
| 26 | dump rope | 28 | dump block |
| 30 | drag chain | 32 | arch |
| 34 | drag socket | 36 | drag line |
| 38 | top rail | 40 | drag chain hitch |
| 42 | upper hoist assembly | 44 | lower hoist assembly |
| 46 | tensile member | 48 | yoke |
| 50 | dump block mount | 52 | bend-limited tensile member |
| 54 | stranded core | 56 | armor layer |
| 58 | filler layer | 60 | clevis-receiver |
| 62 | cross pin | 64 | termination |
| 66 | bending plane | 68 | edge |
| 69 | transverse opening | 70 | flexible overmold |
| 72 | metal eye | 74 | wound fiber core |
| 76 | receiver | 78 | armored tensile member |
| 80 | leaf spring | 82 | collector block |
| 84 | first cross pin | 86 | transverse cross pin |
| 88 | articulation block | 90 | tension spring |
| 92 | compression device | 94 | fiber cover |
| 96 | helically wrapped strands | 98 | helically wrapped tube |
| 100 | bumper | 102 | radius |
| 104 | sleeve | 106 | potted volume |
| 108 | flange | 110 | chain segment |
| 112 | bias device | 114 | intermediate termination |
| 116 | secondary armor layer | 118 | jacket |
| 120 | gap | 122 | anchor |
| 124 | expanding cavity | 126 | potted region |
| 128 | connecting fixture | 130 | collar |
| 132 | transverse hole | 134 | bolt |

DETAILED DESCRIPTION OF THE INVENTION

Figure 6:
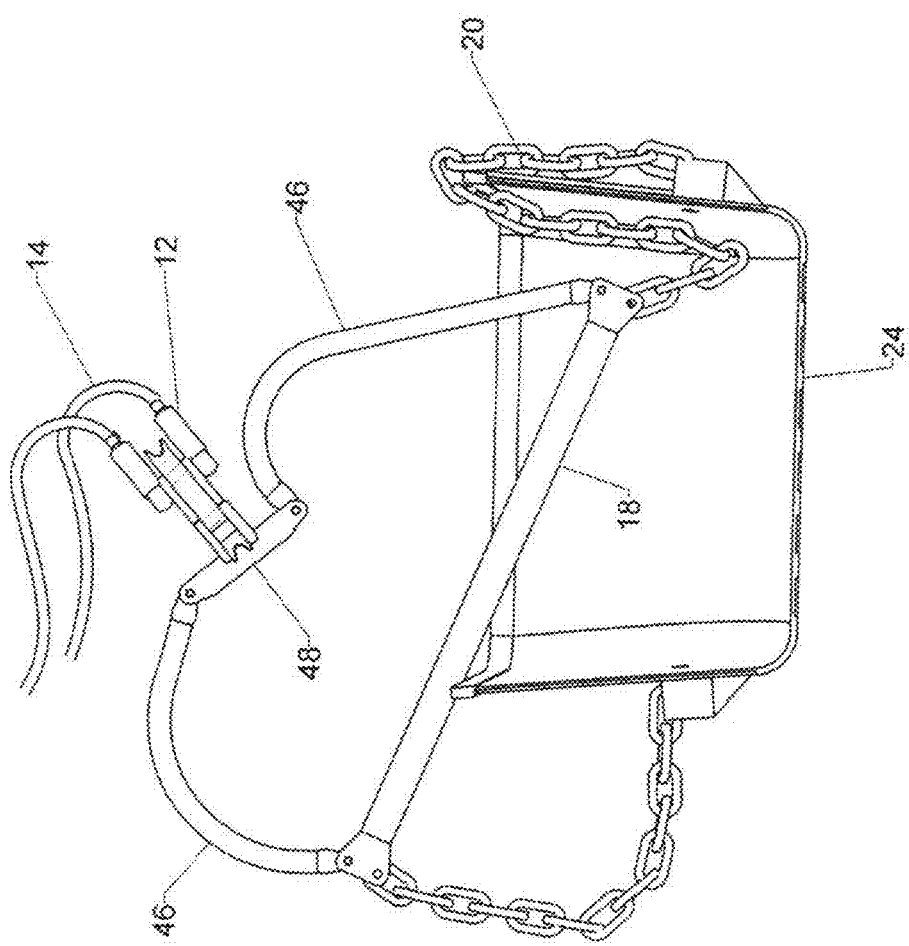
FIG. 6 is a sectional elevation view, showing a bucket assembly made according to the present invention.

FIG. 6 shows a dragline bucket assembly made according to the present invention. A pair of bend-limited tensile members 46 are used to link each end of spreader bar 18 to yoke 48. Each tensile member replaces a prior art upper hoist chain. However, the tensile members 46 possess novel features. They are of course primarily intended to carry a tensile load, such as when the crane reels in lift ropes 14 in order to lift the bucket assembly clear of the ground.

However, as shown in FIG. 6, tension has been removed from lift ropes 14 and the dragline bucket assembly is in the process of being laid on the ground. Ordinarily the substantial weight of yoke 48 and the hardware attached to the yoke would cause the upper hoist assembly to collapse into a tangled heap. However, the construction of tensile members 46 provides a limited compressive strength in addition to their primary tensile strength.

A group of core strands carries the tensile load within each tensile member 46 (The construction will be explained in more detail subsequently). Every group of core strands has a "critical radius." If the group is bent around a radius that is smaller than this critical radius, at least some of the strands within the group will be plastically deformed. An important objective of the present invention is ensuring that the core strands of each tensile member do not undergo a bend that it tighter than the applicable critical radius during normal operations.

Dragline rigging undergoes two different classes of operation that may be deemed "normal." The first class involves the actions of moving the bucket, digging with the bucket, and dumping the bucket. The second class involves lowering the bucket to the ground and setting the associated rigging on the ground so that the bucket and rigging may be inspected and/or serviced. The forces placed on the rigging may be quite different for these two classes of operation.

FIG. 6 shows a portion of the bucket rigging as the bucket and rigging are being lowered to the ground. The reader will observe how the two tensile members 46 are bending under the applied weight of the yoke. The yoke is still descending at this stage. The tensile members are designed to partially bear the weight of the yoke as it descends—while keeping the radius of any bends in the tensile member above the critical radius. As explained in the following, the tensile members used in the present invention have a combination of features that overcome the shortcomings found in the prior art.

FIG. 6 actually shows the assembly as it is settling under its own weight (the lifting force from the crane having been removed). The assembly will not remain as shown. Rather, the spreader bar will likely rotate and allow the assembly of tensile members 46 and yoke 48 to pivot forward or backward until they come to rest. Some out-of-plane will also likely occur. The bend-limiting nature of the tensile members reduces the chance of their falling under the yoke and its associated components as the assembly comes to rest.

The improvement in the prior art collapsing sequence of the bucket rigging does not mean that a tensile member 46 will never come to rest beneath a heavy component or be pinched or pulled against an edge. In many cases the upper hoist rigging will be required to bend around bucket top rail 38, which is often quite sharp. The rigging will experience these forces while it is still under some tension. Thus, it is still preferable to provide some "armoring" to protect the tensile members. One may therefore generalize a preferred tensile member as (1) possessing excellent strength in tension; (2) possessing a lower but still sufficient strength in compression (sufficient to eliminate the likelihood of the tensile member undergoing a damaging sharp bend); (3) possessing resistance to lateral battering and bending forces; and (4) possessing some flexibility to allow the assembly to move as it needs in order to collapse to the ground.

The reader may naturally wonder whether the tensile elements shown as tensile members 46 could simply be made completely rigid. Some flexibility in the tensile members 46 is still desirable for many operation reasons. The bucket is often dropped onto lateral slopes and uneven ground. Flexibility in the rigging allows for energy absorption. A rigid structure may also suspend heavy components off the ground when the bucket is laid down for inspection and repair. This is an unsafe condition. The present invention therefore employs tensile members fir the upper hoist assembly that can bend and flex, but which retain enough rigidity to prevent the tensile members bending into a bend radius small enough to plastically deform the core strands.

Figure 7:
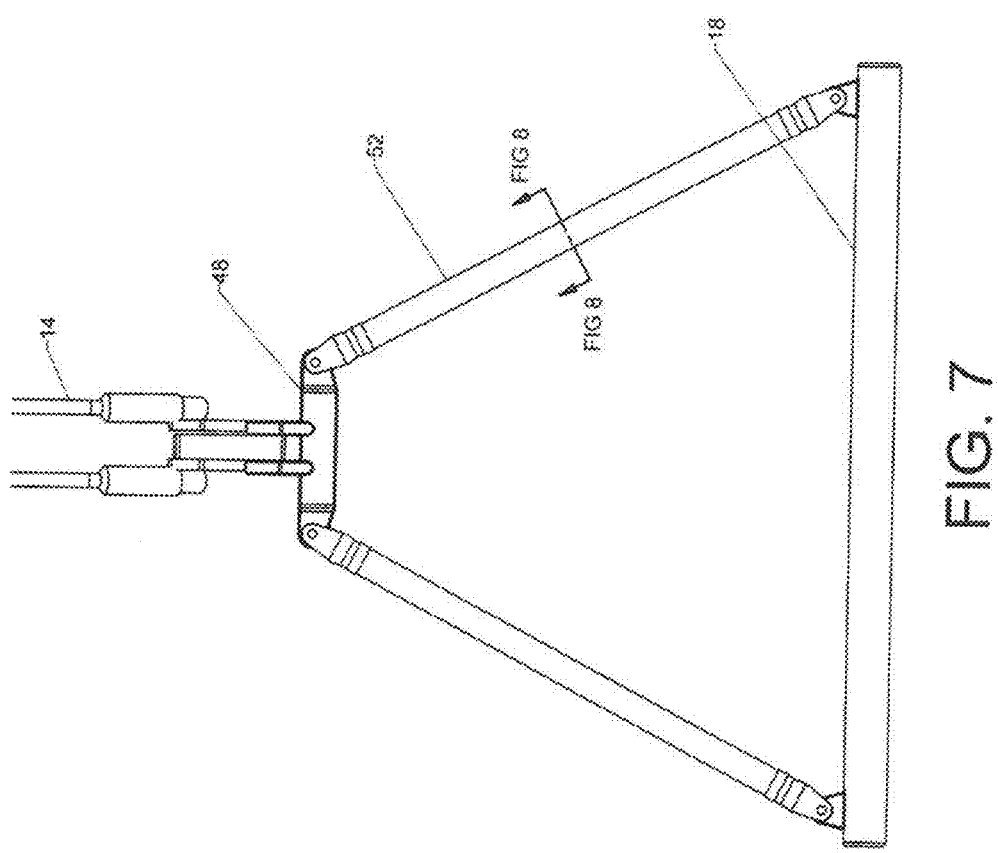
FIG. 7 is an elevation view, showing a pair of bend-limited tensile members used in the invention.
Figure 8:
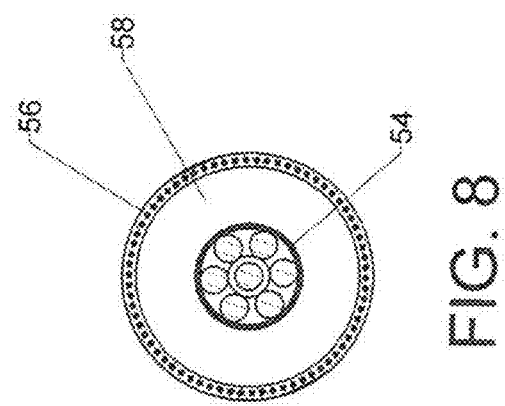
FIG. 8 is a sectional view through one of the bend-limited tensile members of FIG. 7.

These goals may be achieved using a wide variety of structures. FIG. 7 illustrates one such structure. Spreader bar 18 is linked to yoke 48 by a pair of bend-limiting tensile members 52. FIG. 8 is a cross-sectional view through one of the bend-limiting tensile members. Stranded core 54 is surrounded by filler layer 58 and the entire assembly is surrounded by armor layer 56. Stranded core may be made of steel strands or synthetic strands. Synthetic strands may be made of PBO, VECTRAN, KEVLAR, NYLON, POLYESTER, DYNEEMA, SPECTRA, TWARON, carbon fiber, TECHNORA, ZYLON, or other suitable material. The diameter of the stranded core may be as small as 0.500 inches for synthetic strands. The diameter of the stranded core may also be 8 inches or even larger.

Filler layer is preferably selected for its compressive strength and toughness. However, it should be more pliable than either the stranded core or the armor layer. It is preferable for the filler layer to provide cushioning, both to blunt the impact of lateral blows and to help create larger bend radii for the core strands. Suitable materials include cross-linking urethane, synthetic rubber, natural rubber, gel material, and closed or open-celled foams. In fact, if the end fittings and armor layer provide suitable sealing, the compressive layer may even be a gas such as air or nitrogen. Such fillers may also be used to provide a barrier against harmful debris that have penetrated the armoring layer.

Figure 11:
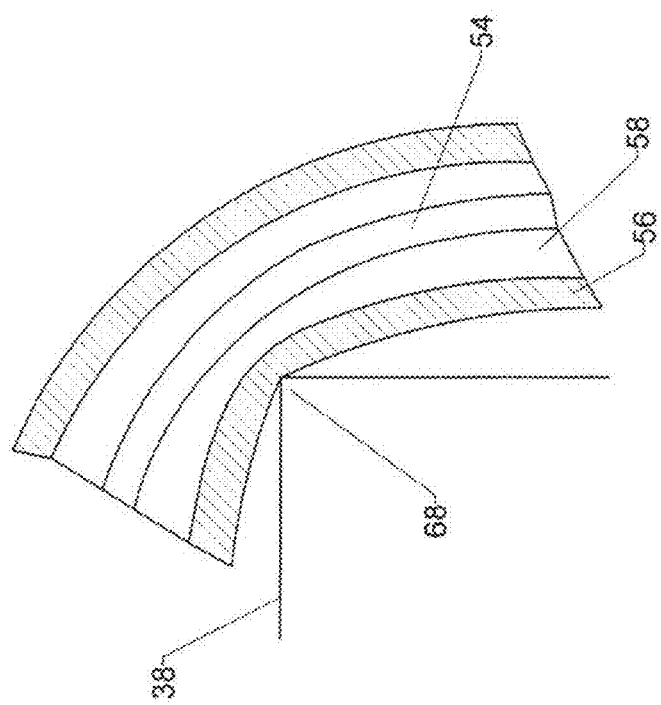
FIG. 11 is a detailed sectional view, showing the use of an armor layer on a tensile member.

FIG. 11 shows a tensile member made using this construction that is bent around edge 68 (such as exists proximate top rail 38 of the dragline bucket). Filler layer 58 is able to compress to effectively create a larger bend radius for stranded core 54. Armor layer 56 experiences a smaller bend radius. The critical bend radius for the stranded core will differ according to the material and construction used for the stranded core. The term "construction" refers to how the strands within the core are arranged (parallel strands, helically-wound strands, woven strands, etc.). In general, the term "critical bend radius" means the minimum radius around which the stranded core may bend without suffering plastic deformation of at least some of its components. For most synthetic strands, the critical bend radius under low load is typically greater than ¼ the radius of the stranded core itself. For metallic strands the critical bend radius is larger—typically greater than the radius of the stranded core itself.

Returning to FIG. 8, the reader will note the relative thickness of armor layer 56. The armor layer preferably provides sufficient protection against crushing, cutting, abrasion, impacts, bending, or any other force that could plastically deform some portion of the stranded core. The armor layer may also be used to prevent harmful debris from wearing the tensile member. The armor layer will often be greater than 0.100 inches thick and may exceed 2 inches in thickness. It may be made as a single layer or may be made as multiple layers. Many materials may be used for this layer, including natural rubber, synthetic rubber, high-density polyethylene, and fiber-reinforced materials.

Figure 9:
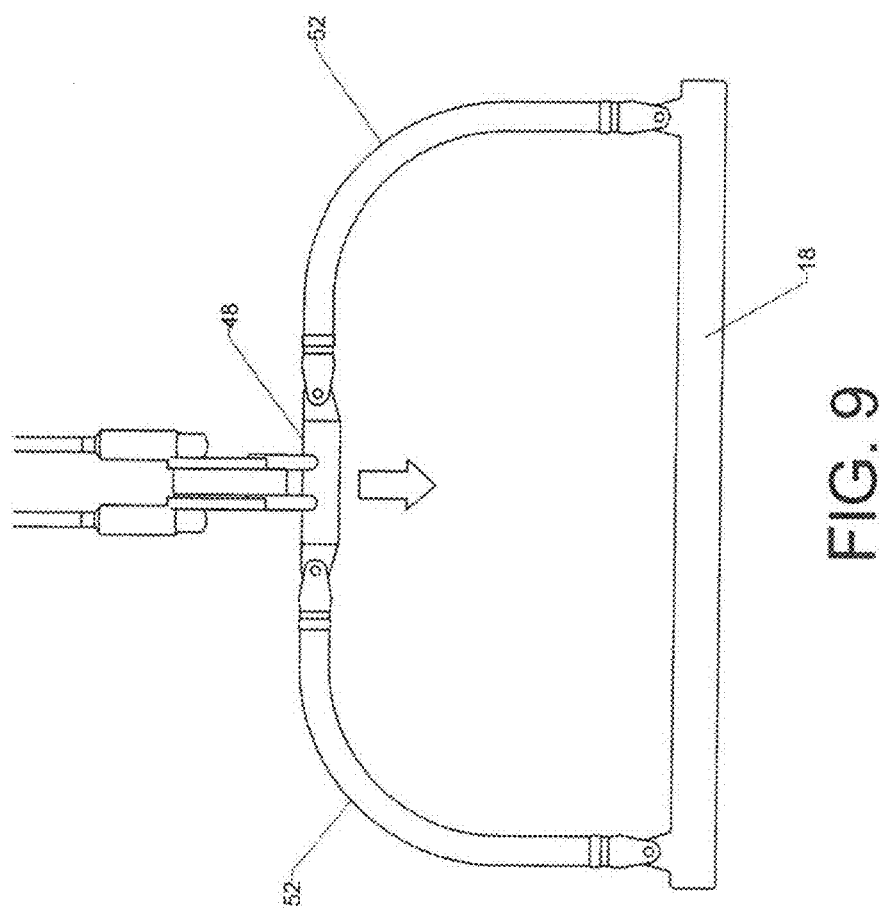
FIG. 9 is an elevation view showing the operation of the bend-limited tensile members when the lifting tension is removed.

FIG. 9 shows the initial (and somewhat idealized) collapse of the upper hoisting assembly when tension on the lifting cables is removed. The weight of yoke 48 and attached components causes both bend-limited tensile members 52 to bend outward as shown. The bending does not continue past the point of plastic deformation of the core strands, however, as the stiffness of the filler and armor layers are capable of providing enough compressive strength to prevent this. This feature preserves the core strands until such time as the heavy components shift and find their way to the ground. The reader should note that the tensile members shown in FIG. 9 are shortened somewhat so that the reader may visualize all the components in a single view. In reality the tensile members may be much longer.

As stated previously, a portion of the tensile members will often tend to fall off the back or side of the bucket at some point. Part of the tensile member will then be draped across the edge of the bucket and may in fact be dragged along or pulled sharply over the edge. An idealized assembly such as shown in FIG. 9 may ease the transition from the lifted state to the collapsed state but the armoring of the tensile members is still important.

Figure 10:
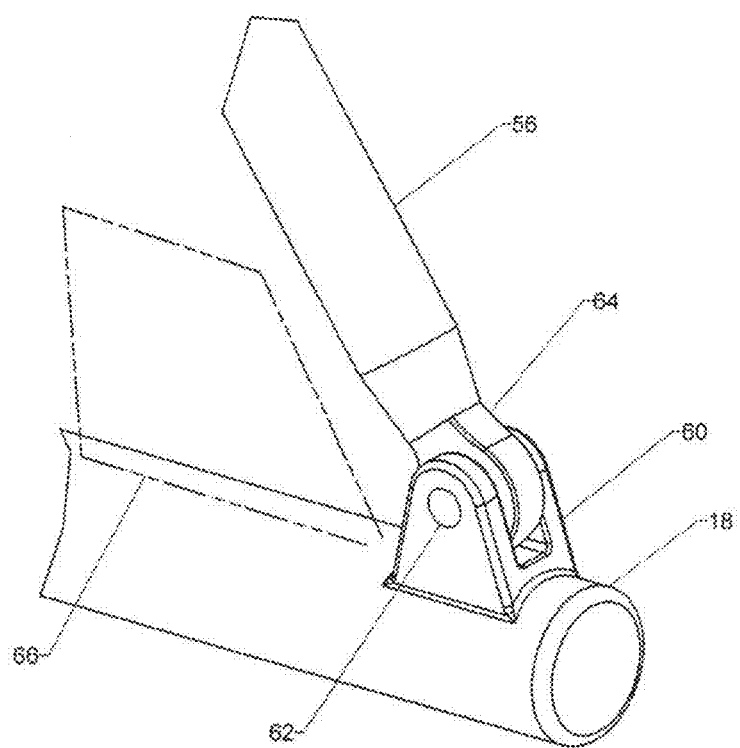
FIG. 10 is a detailed perspective view, showing one type of attachment that may be used for the spreader bar.

FIG. 10 shows some details of how bend-limiting tensile member may be connected to spreader bar 18. Each end of the tensile member is provided with a termination 64. These terminations are joined to the tensile member using a variety of techniques, including potting, swaging, spike-and-cone connections, weaving around a grommet, etc. While the details of how such terminations are attached is beyond the scope of this disclosure, the interested reader is referred to my U.S. Pat. Nos. 7,076,853, 7,536,754, 7,669,294, 7,818, 849, and 8,215,886. These patents are hereby incorporated by reference. Termination 64 is representative of many differing types of attachment components and should in no way be viewed as limiting.

Clevis receiver 60 is provided on the spreader bar. Termination 64 includes a tang which slides into the clevis-receiver. A Cross pin 62 is then passed through aligned transverse holes in the clevis-receiver and the termination. The cross pin is typically retained in position by a welded tab, cottar key, or similar element.

Those skilled in the art will rapidly appreciate that termination 64 is thereby made free to pivot about cross pin 62. However, the existence of the pinned joint means that the termination can only easily rotate in a plane that is transverse to the pin. This constraint likewise promotes the flexing of the cable within bending plane 66.

Returning now to FIG. 9, the reader will observe how the deformation of the tensile members is constrained somewhat by the use of the tang and clevis joint (The fact that the tensile member is flexible means that it can also bend out of plane, just not quite as easily). Once the assembly collapses to the point shown in FIG. 9, the bend-limited tensile members preferably helps support part of the weight of the yoke (or at least provide enough collapse resistance to push the assembly apart while it descends to the ground). The weight of the yoke and associated components will cause the assembly to rotate around the spreader bar until it falls on some supporting object (typically the bucket or sometimes the surrounding ground). However, the fact that the yoke is held away from the spreader bar means that the tensile members 52 are less likely to be pinched or pulled against the spreader bar by the weight of the yoke, dump block, or other rigging components. Likewise the tensile members are less likely to be pinched or pulled against the spreader bar or against something else, since the tang and clevis joints used make is less likely that the tensile member will get under the spreader bar. The armoring also provides sufficient protection when the tensile members do encounter undesirable collapsed configurations.

Figure 12:
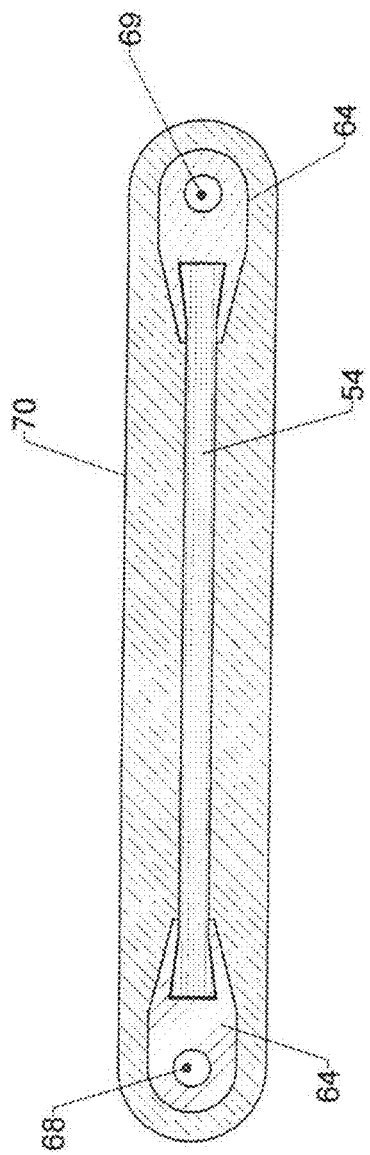
FIG. 12 is a sectional elevation view, showing a flexible overmold on a tensile member.

In addition to the preferred rigidity the proposed tensile member also needs to possess "armoring" able to withstand various lateral forces, sharp edges, and blows. One way to provide both rigidity and armoring is the use of overmolding. The term "overmolding" refers to molding a suitable molded material (such as a polymer) over the top of the exterior surfaces of a previously-created assembly. The overmolded layer provides rigidity and armoring. FIG. 12 provides one example of an overmolded assembly. Stranded core 54 has two ends. Each of these ends is connected to a termination 64 incorporating a transverse opening 69. In the example shown, the free ends of the stranded core are potted into an expanding cavity in each termination. The overmolding may also be used to cover only portions of the tensile member, not necessarily including the terminations.

Once the assembly of stranded core 54 and the two terminations 64 is completed, the assembly is placed into a mold cavity. A suitable molding compound is then injected around the assembly. The molding compound transitions from a liquid to a solid to form flexible overmold 70. The material used for the flexible overmold should provide suitable impact cushioning, cut resistance, abrasion resistance, and the desired compressive strength (the bend-limiting feature). Various natural and synthetic rubbers may be used for this purpose. HDPE may also be used. In some embodiments the overmold may be created as multiple layers bonded together.

The flexible overmold includes transverse holes aligning with the two transverse openings 69. From the exterior, the assembly may appear to be a unified piece made of the overmold material as the internal components will often not be visible. However, the use of stranded core 54 allows the assembly to carry a tensile load that is at least an order of magnitude greater than would be possible using the overmolding material alone (and will in most cases be several orders of magnitude greater).

The use of overmolding also allows the creation of a "pre-bent" shape if desired. The embodiment of FIG. 12 shows an overmold created with a straight stranded core. One could also bend the stranded core into a "dogleg" configuration and place the bent stranded core into a mold cavity that includes a corresponding "dogleg." Once the overmolding process is completed, the assembly will have a dogleg shape. When the tensile member is attached to the bucket assembly the dogleg shape will be pulled straight under tension. However, when the tension is removed the tensile member will naturally seek to return to the dogleg shape and this action will make it tend to bend in a predictable direction and to a predictable extent. Of course, this type of pre-bent configuration could be accomplished in many different ways, including the use of pre-tensioning strands.

Figure 13:
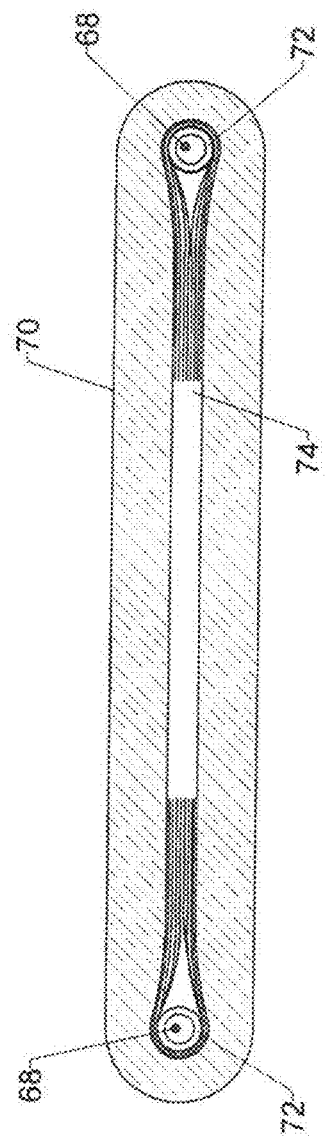
FIG. 13 is a sectional elevation view, showing the use of a flexible overmold on a wound fiber tensile member.

FIG. 13 shows an overmolded assembly that is made with a different type of internal construction. In this construction one or more individual synthetic fibers are wound many times between two metal eyes 72 to create wound fiber core (74) (The fibers are not shown in the middle of the view as the lines become too close together). The fibers may be placed in a flexible binding material to retain the desired position and orientation. Once this is complete the assembly is placed in a mold cavity and a flexible overmold is added as for the embodiment of FIG. 12.

The stranded core could be made in many additional ways. It could be made as a spliced rope, a fiber sling, a round rope sling or grommet, a steel cable, and a composite of multiple materials and/or multiple tensile members. Any of these constructions could be made into an overmolded assembly.

Figure 14:
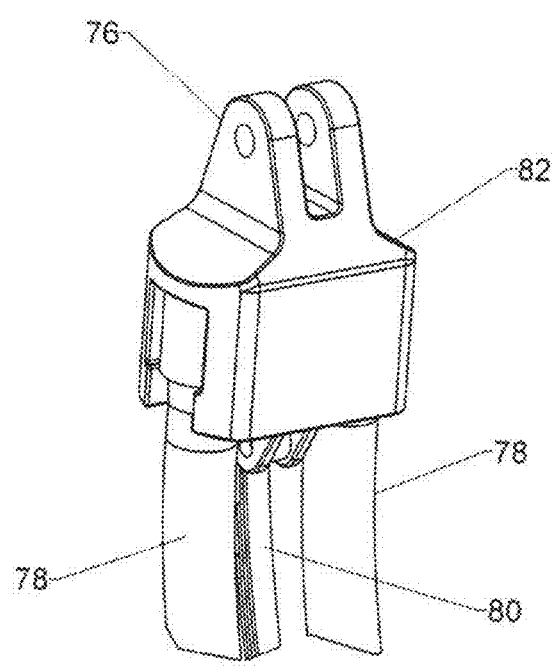
FIG. 14 is a perspective view, showing the use of a leaf spring as a bend-limiting device.
Figure 15:
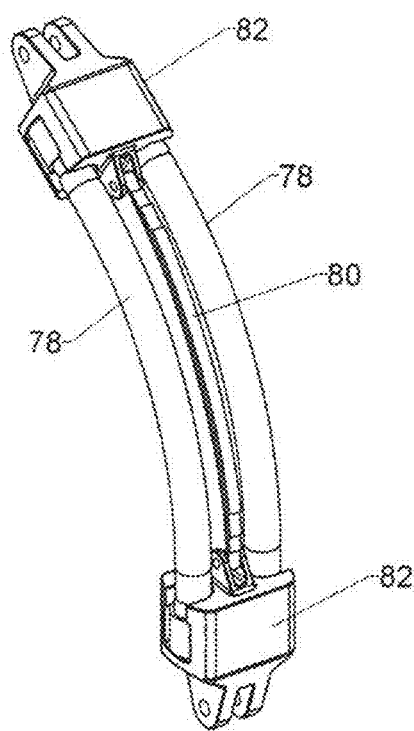
FIG. 15 is a perspective view, showing the bending of the assembly of FIG. 14.

FIGS. 14 and 15 illustrate still another embodiment of a bend-limiting tensile member. Each end of the tensile member is provided with a collector block 82. One or more armored tensile members 78 are attached to the collector block as shown. The collector block also includes a load transferring feature such as receiver 76. Leaf spring 80 is connected in parallel with the armored tensile member(s). The leaf spring in this example is an assembly of steel pieces having a rectangular cross section. It is similar to a single leaf used in an automotive leaf spring assembly. The leaf spring may also be a single composite piece or anything else providing the desired rigidity and compressive strength in order to help direct the bending behavior of the tensile members (and maintain the critical radius objective).

As discussed previously, it may be preferable in some embodiments to have significant compressive resistance. FIG. 15 shows a complete bend-limiting tensile member assembly incorporating a parallel leaf spring as shown in FIG. 14. The reader will observe the presence of a collector block 82 on each end. A pair of armored tensile members 78 is connected between the two collector blocks. Leaf spring 80 is also connected between the collector blocks. FIG. 15 shows the assembly when it is placed in compression. Leaf spring 80 takes the compressive load and elastically deforms. However, the leaf spring is sized so that the anticipated compressive loads will not produce any plastic deformation in either the leaf spring or the armored cables. In some applications this may require the use of a leaf spring assembly having multiple leaves (as shown).

Figure 16:
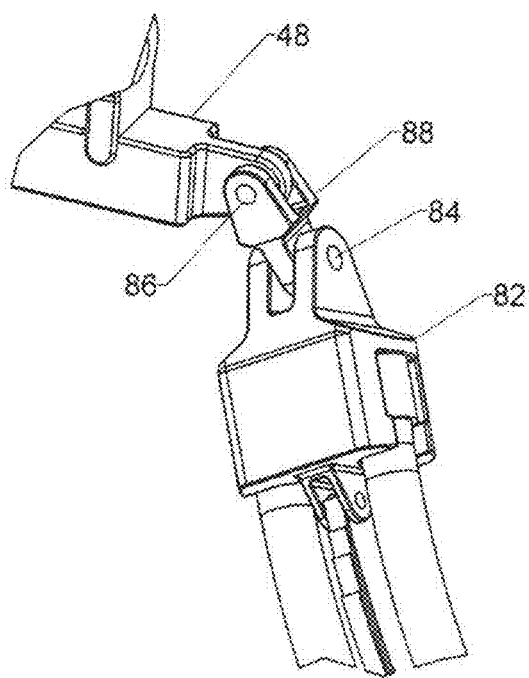
FIG. 16 is a perspective view, showing the use of an articulation block.
Figure 23:
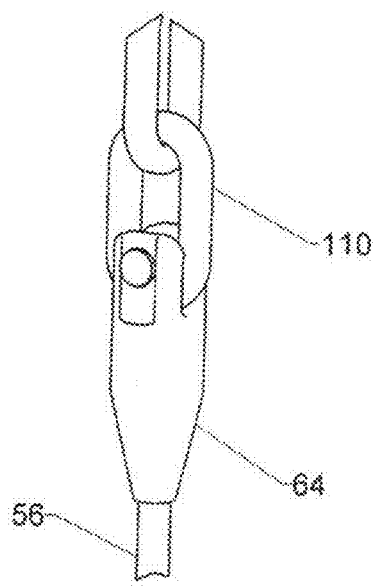
FIG. 23 is a detailed perspective view, showing the use of a chain segment in combination with the present invention.

Since the bend-limited tensile member assembly will be replacing a prior art chain, it may be advantageous to provide additional degrees of freedom proximate the end connections (chain generally having several degrees of freedom). FIG. 16 shows a collector block having an additional articulation block 88. Articulation block 88 is pivotally connected to collector block 82 using first cross pin 84. It is pivotally connected to a portion of yoke 48 using transverse cross pin 86. The reader will note how the use of the two cross pins allows the assembly to easily flex in two planes. This ability will often help the bucket rigging collapse without creating excessive forces. FIG. 23 shows another type of articulation block. A short chain segment 110 may be used to provide the desired flexibility. Many such devices allowing bending in multiple planes are possible, and may be used to increase the likelihood of bending in a desired plane.

Figure 17:
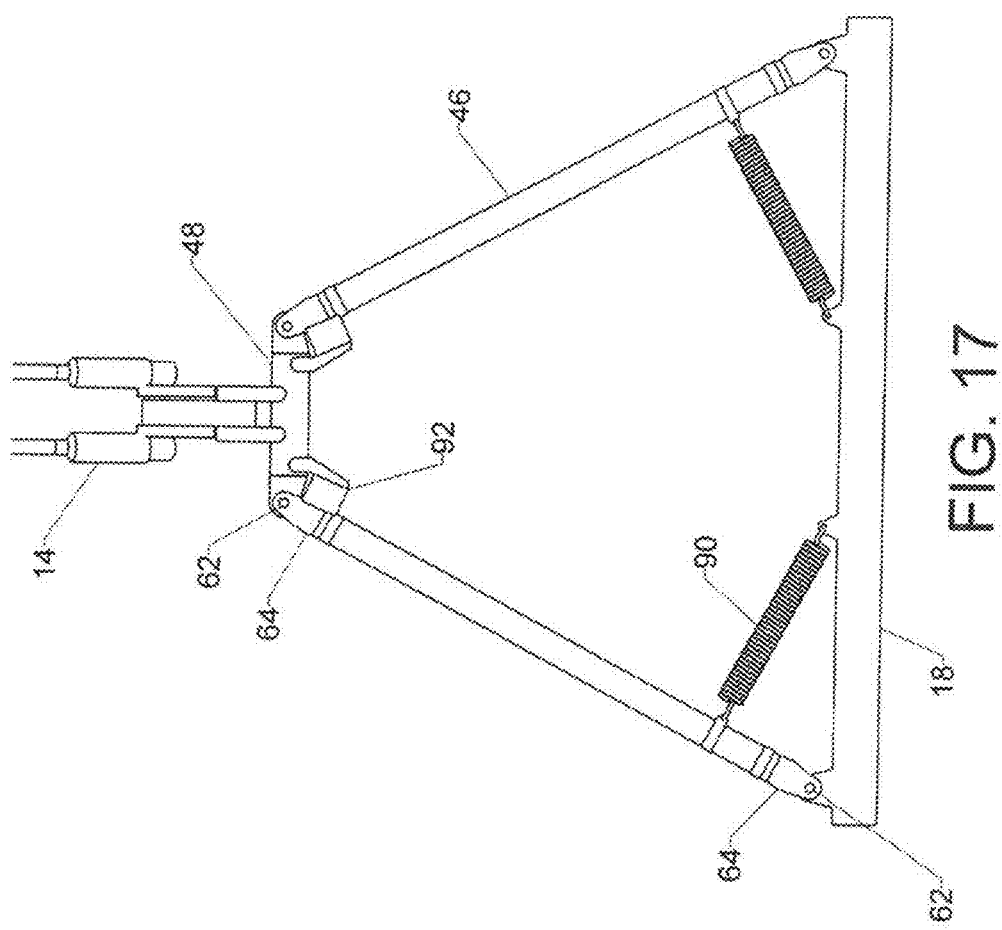
FIG. 17 is an elevation view, showing the use of compressive and tensile devices to control the bending of a tensile member in the hoist assembly.
Figure 18:
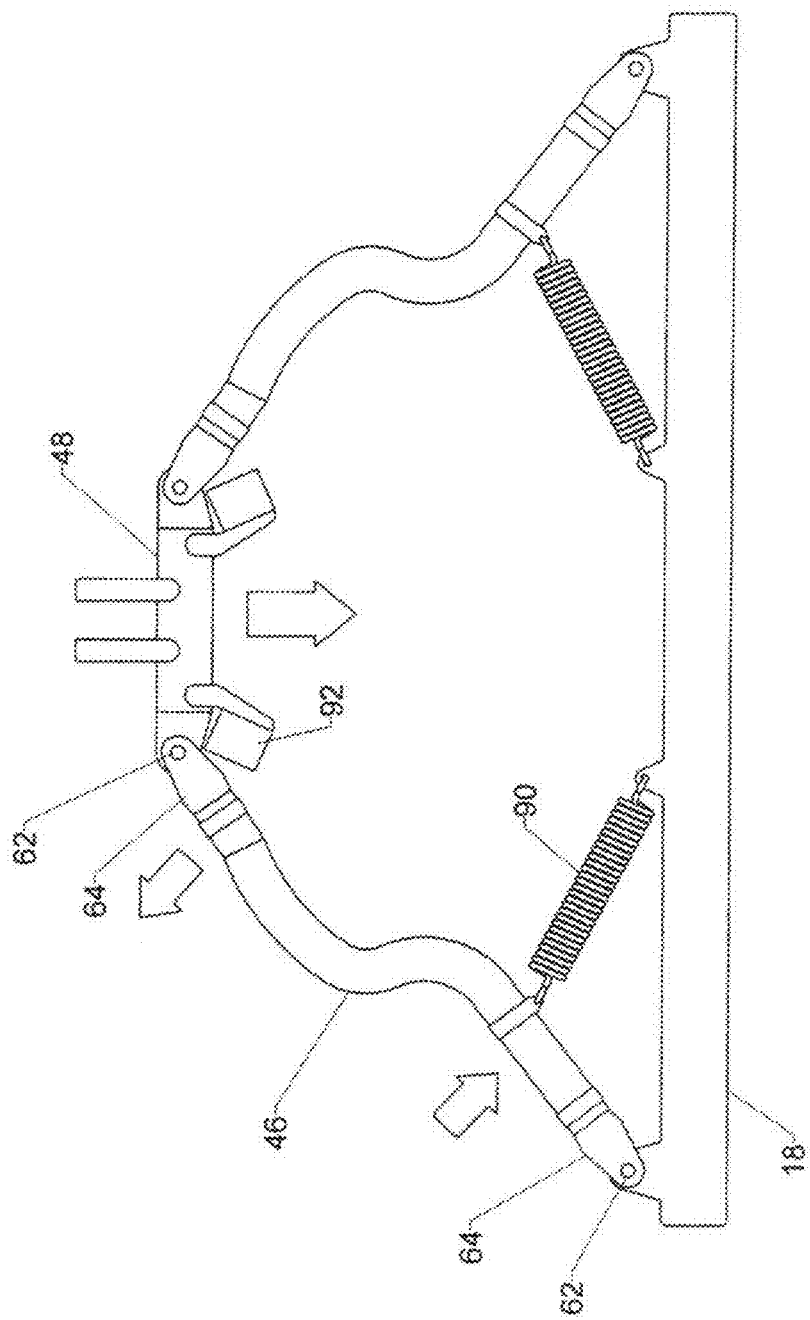
FIG. 18 is an elevation view, showing the operation of the assembly of FIG. 17.

FIGS. 17 and 18 show the addition of more components intended to ensure that the tensile member bends in a predictable way. When the bucket assembly is laid on the ground it is sometimes advantageous to know which way a component will fold (in order to keep it from folding under some other heavy or damaging component). FIG. 17 shows an upper hoist assembly having two tensile members 46 connecting spreader bar 18 to yoke 48. Each tensile member includes a pair of terminations. The terminations are pivotally connected to the spreader bar and the yoke.

Tension spring 90 applies a torque to the lower termination in the view. Compression device 92 (a block of compressible material) likewise applies a torque to the upper termination. The tension and compression devices may be mechanical springs, air struts, or even active actuators. When the dragline bucket assembly is supported by lift ropes 14, each tensile member 46 is pulled taut and the torsional forces applied by the components 90, 92 are negligible. Of course, these devices could also be used as bend limiters in the opposing directions.

FIG. 18 shows what happens when operating tension is removed from the lift ropes. Compression device 92 rotates the upper termination in a clockwise direction and tension spring 90 rotates the lower termination in a clockwise direction. The result is the bending of tensile member 46 into an "S" shape.

Figure 19:
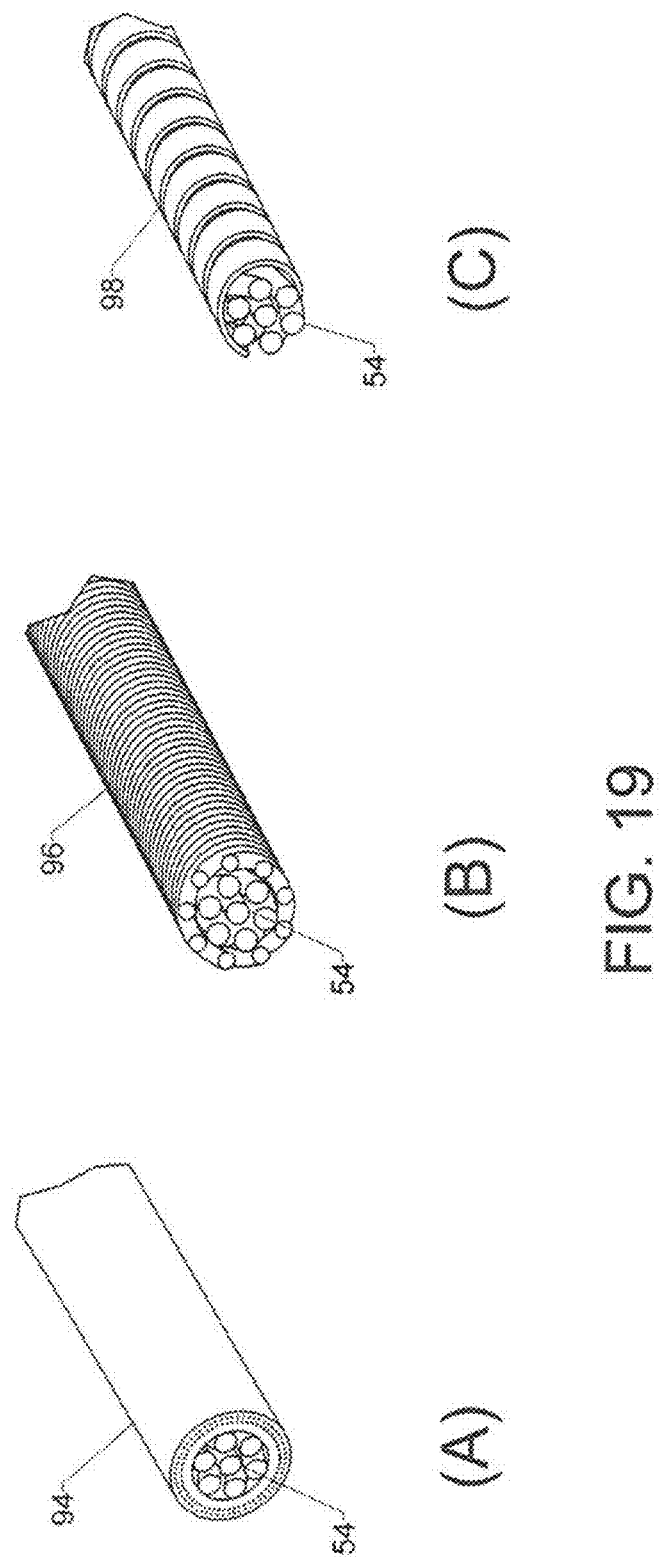
FIG. 19 is a detailed perspective view, showing three types of tensile member armoring.

FIG. 19 provides some additional examples of the type of armoring that may be provided around a stranded core 54. FIG. 19(A) shows a woven or braided fiber cover 94 (such as commonly used on synthetic fiber ropes). FIG. 19(B) shows a covering of helically wound strands 96 (such as use for armoring wires). FIG. 19(C) shows a covering made of a helically wrapped tube of tough plastic 98 (such as used on hydraulic hoses). Fiber-reinforced rubber tubing may also be used. Many other "armoring" covers could be used, including the use of hardened steel.

Figure 20:
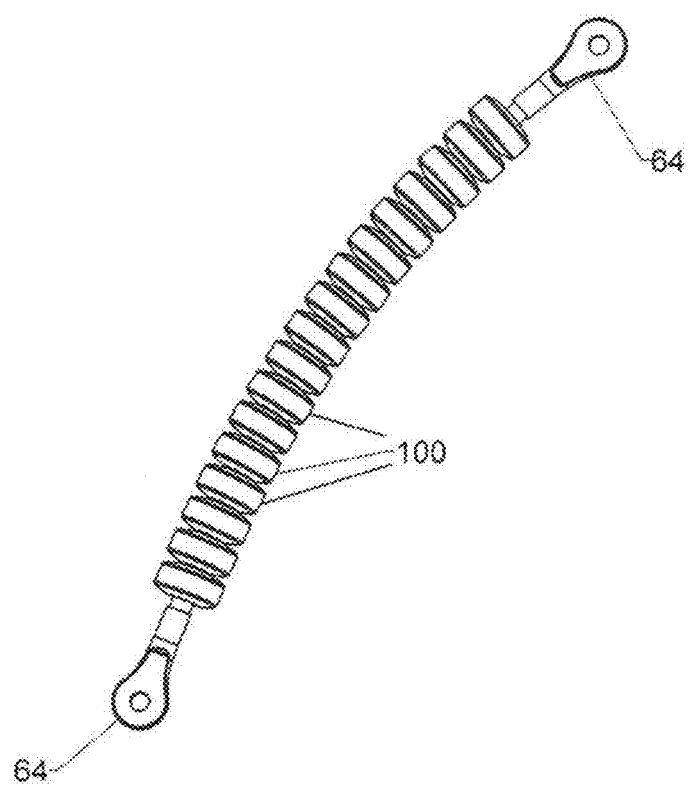
FIG. 20 is an elevation view, showing the use of bumpers to limit bending.
Figure 21:
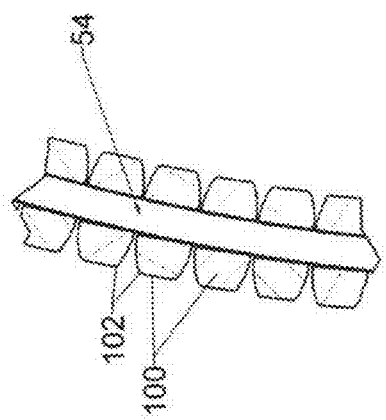
FIG. 21 is a detailed sectional view, showing the bumpers of FIG. 20.
Figure 22:
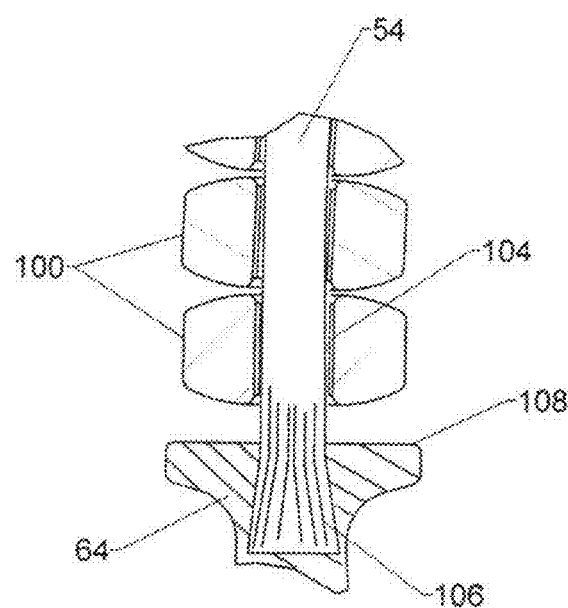
FIG. 22 is a detailed section view showing the use of a flange in the cable termination of FIG. 20.

FIGS. 20-22 show still another way to provide the desired toughness, compressive strength, bend-limiting features, and suitable armoring. The flexible tensile member shown is provided with a series of abutting bumpers 100. FIG. 21 shows a detailed sectional view through this assembly. The adjoining bumpers may be provided with a large radius 102. This allows the tensile member to bend somewhat before the adjacent bumpers run into each other. The bumpers may be made of a tough and flexible material such as synthetic rubber. They may also be made of a more rigid material, such as hardened steel or aluminum. The segmented components could take on many different forms, including the use of interlocking or other advanced features.

FIG. 22 shows more possible features that may be included in such an assembly. Each bumper 100 includes a sleeve 104 configured to slide along the exterior of stranded core 54. Each free end of the stranded core is potted into a termination 64 via potted volume 106 in the example shown. The portion of each termination facing the bumpers is given flange 108—so that the termination bears against the first bumper over a large surface area. The reader will thereby appreciate how the inclusion of the bumpers and the flange armors the tensile member against lateral compression blows and sharp edges, and also limits the bending of the tensile member.

Figure 24:
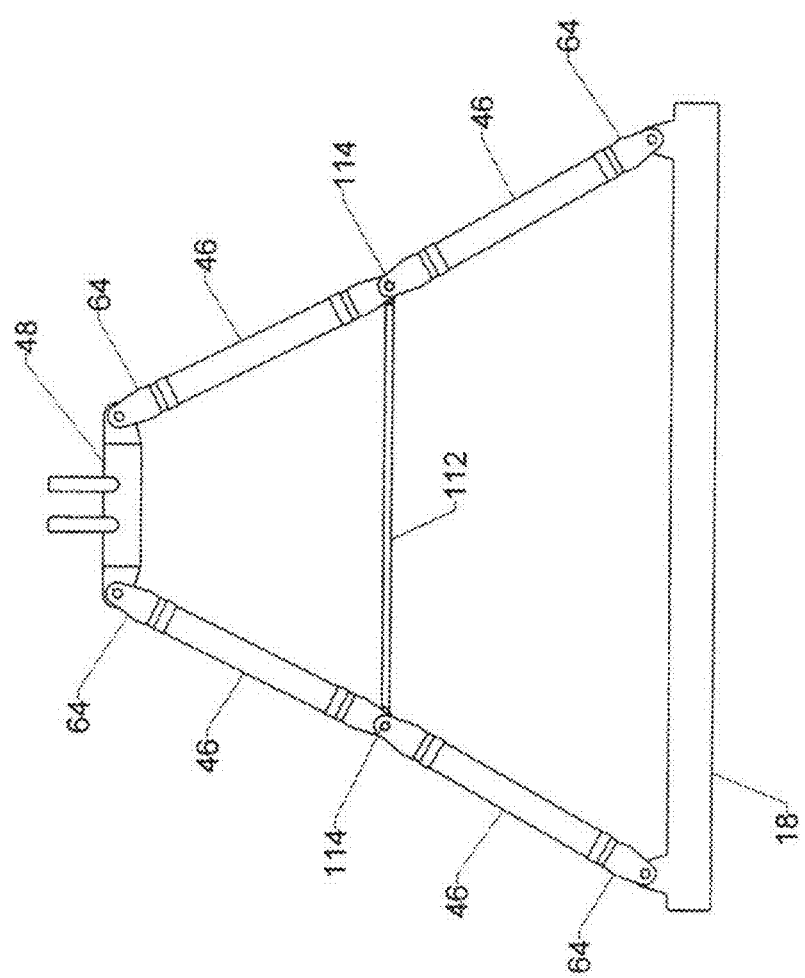
FIG. 24 is an elevation view, showing an alternate embodiment of the present invention.

FIG. 24 shows another embodiment in which multiple tensile member 46 on each side of the rigging are provided with an intermediate termination 114 between the connections to yoke 48 and spreader bar 18. Bias device 112 is connected between the two intermediate terminations. The bias device may force the intermediate terminations either outward or inward—as desired. This action controls how tensile members 46 will bend when the lifting force is removed from the yoke. Bias device 112 could also be a static bar link.

Figure 25:
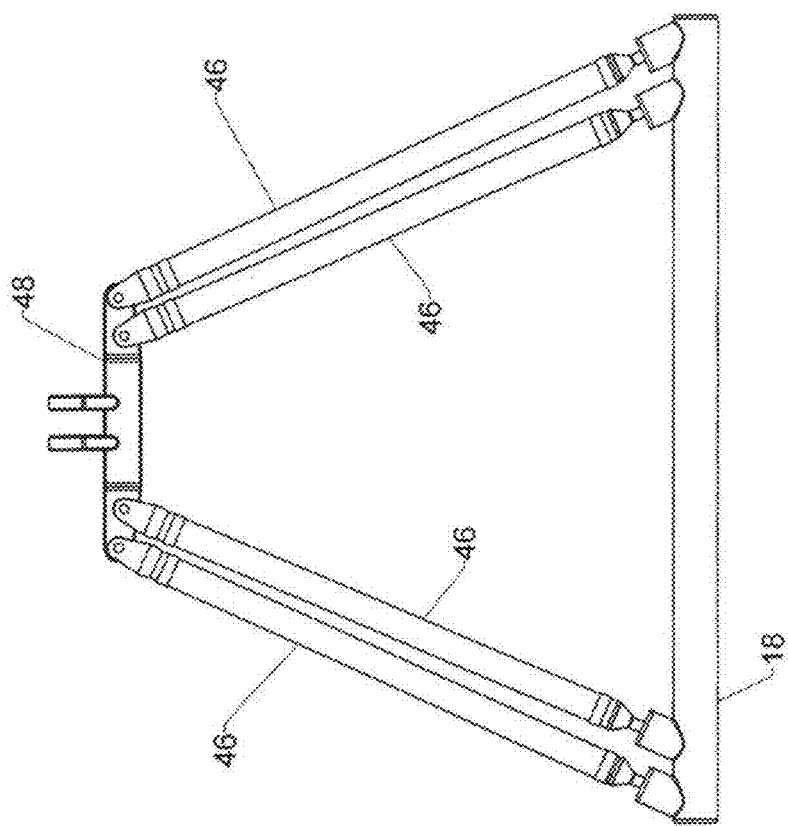
FIG. 25 is an elevation view, showing still another embodiment of the present invention.

Of course, it may be desirable in some applications to provide more than two tensile members connecting the spreader bar and yoke. FIG. 25 shows an embodiment in which four tensile members 46 are used. In some embodiments many tensile members will be grouped and run in parallel.

Figure 26:
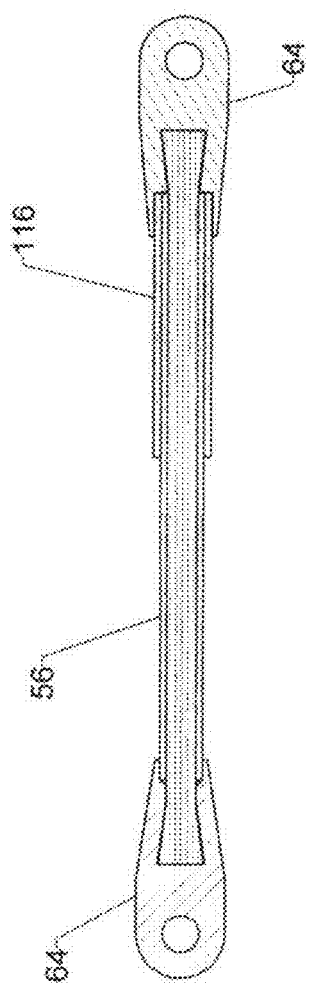
FIG. 26 is a sectional view, showing an embodiment of an armored tensile member having differing levels of armor.

Finally, although the preceding embodiments have shown bend-limited tensile members with a constantly-bending structure (and uniform armoring) this need not always be the case. FIG. 26 shows an embodiment in which one end of the tensile member is made stiffer than the other (and provided with greater armoring). The entire length of the exposed core strands is surrounded by armor layer 56, which provides a first degree of compressive stiffness. Secondary armor layer 116 is provided over only a portion of the tensile member. It provides even greater compressive stiffness for a portion of the tensile member. The presence of this greater stiffness may be used to control how the tensile member will deflect. The presence of the additional armoring may be used to address abnormal pinch, cut, or wear concerns existing over only a portion of the tensile member's length.

In many applications the block assembly and related rigging is so heavy that no amount of compressive stiffness in the upper hoist rigging can control the way the components collapse into a tangle once the lifting rope tension is released. In these applications it must be anticipated that at some times the heavy block assembly will land on the upper hoist rigging. The upper hoist rigging may be bent over a corner and subjected to other abuse. Another embodiment for bend-limited tensile member 52 is provided for this environment.

Looking again at FIG. 9, the reader will recall that each bend-limited tensile member 52 connects on its upper end to yoke 48 and on its lower end to spreader bar 18. These connections are most often made by pin joints. FIG. 10 shows the lower joint, with a transverse pin 62 being in place.

Figure 27:
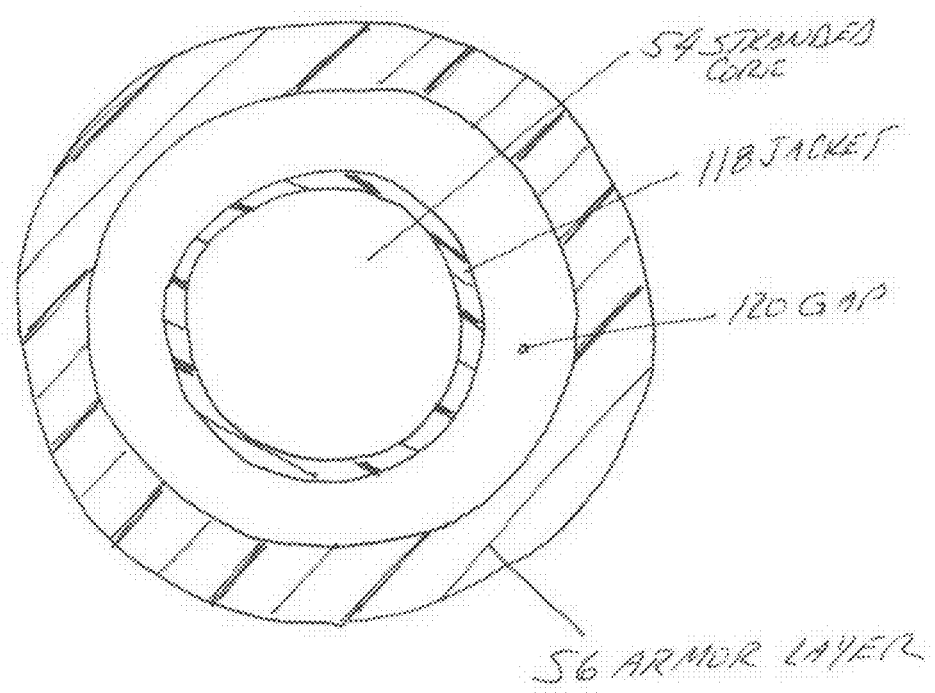
FIG. 27 is a sectional view, showing another embodiment of an armored tensile member.
Figure 28:
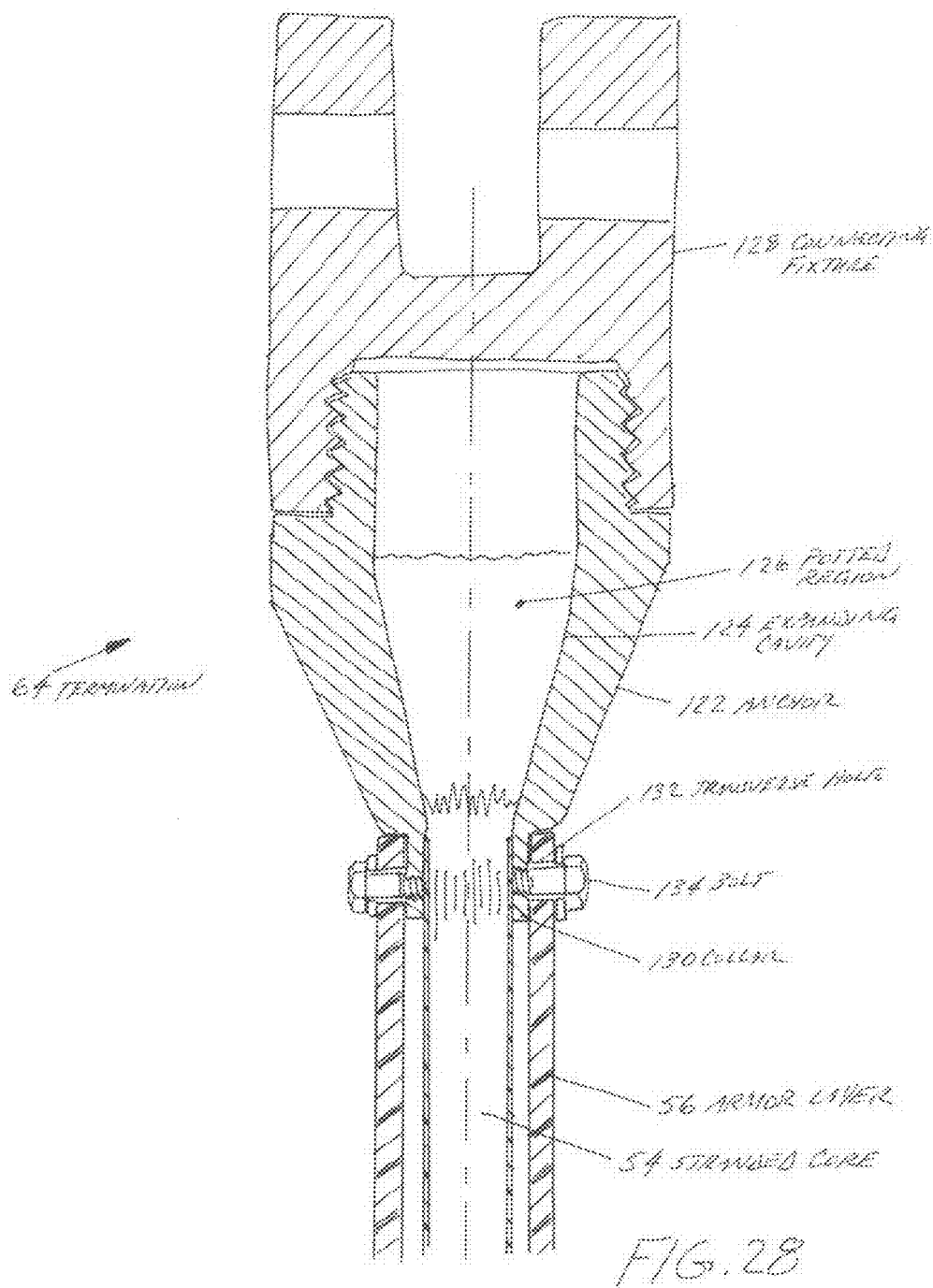
FIG. 28 is a sectional view, showing how the embodiment of FIG. 27 attaches to a termination.

FIGS. 27 and 28 depict an embodiment of the bend-limited tensile member having an altered construction. FIG. 27 shows a cross section through the tensile member. Stranded core 54 includes many individual synthetic fibers—as for the prior examples. These may be purely linear fibers or they may be organized in some fashion (such as winding or braiding). They may also be grouped into strands that are themselves then organized. Armor layer 56 is made of a flexible but tough material, such as natural or synthetic rubber. Armor layer 56 may also be reinforced by fibers or strands of different material.

Unlike the prior examples, a significant gap 120 exists between the core strands and the armor layer. For example, in one example, stranded core 54 has a 5 inch overall diameter while the inside diameter of the armor layer is 6 inches and the wall thickness of the fiber layer is 2 inches. In other words, gap 120 is 0.5 inches.

Jacket 118 may be included around the stranded core but its presence is optional. Whether or not jacket 118 is present, there is no surface bond between the stranded core and the armor layer. The substantial gap between the two allows the armor layer and the stranded core to easily slip with respect to one another (move in the direction of the longitudinal axis). If jacket 118 is present, it preferably has a relatively low surface friction to prevent any binding between jacket 118 and the inward-facing surface of armor layer 56.

Since the armor layer in this embodiment is "floating" with respect to the stranded core, it is preferable to secure the two ends of the armor layer. Securing the ends prevents the entry of unwanted material into gap 120 and minimizes the settling of the armor layer toward the bottom of the upper hoist rigging.

There are many different ways to secure the ends of the armor layer. FIG. 28 presents one possible way. Termination 64 is an assembly that attaches both stranded core 54 and armor layer 56. Stranded core 54 is connected to anchor 122 in this example by potting. The potting process is described in detail in the patents that are incorporated by reference. Briefly, the potting process means placing a length of strands of the stranded core within expanding cavity 124 in anchor 122. At some point the strands within the expanding cavity are infused with liquid potting compound. The potting compound transitions from a liquid to a solid over time. Potted region 126 is thereby created.

The potted region is a composite of solid potting compound and tensile member strands. The mechanical interference between the potted region and the expanding cavity secures stranded core 54 to anchor 122. In this example, connecting fixture 128 attaches to anchor 122. This particular connecting fixture provides a clevis with a transverse bore—suitable for connection to another component using a cross pin.

Anchor 122 includes other features configured to facilitate the connection of armor layer 56. Collar 130 extends out of the anchor's "neck" region. This collar includes a plurality of threaded receivers, each of which is configured to receive a bolt 134. Armor layer 56 is provided with a series of transverse holes 132. Once the armor layer is put in the position shown, a bolt 134 is passed through each of the transverse holes in the armor layer and threaded into one of the threaded receivers in collar 130. The bolts are preferably secured using lock washers, cotter keys, safety wire, or other suitable devices. Although only two bolts are shown, this embodiment actually provides for the use of six bolts that are spaced equally about the perimeter of collar 130.

A gasket or sealant may be used to create a good seal between collar 130 and armor layer 56. A suitable gasket or sealant may be used in all the bolt holes as well. The use of such a sealant helps prevent the ingress of unwanted materials.

A termination 64 must be provided on the two free ends of the bend-limited tensile member. The opposite end of the tensile member will have a termination as well. The connection hardware shown in FIG. 28 is one of many possible different ways to connect the armor layer to the anchors at the two ends. In some embodiments it is desirable to extend the length of collar 130. In other embodiments it may be desirable to use a clamping connection analogous to a compression fitting.

Figure 1:
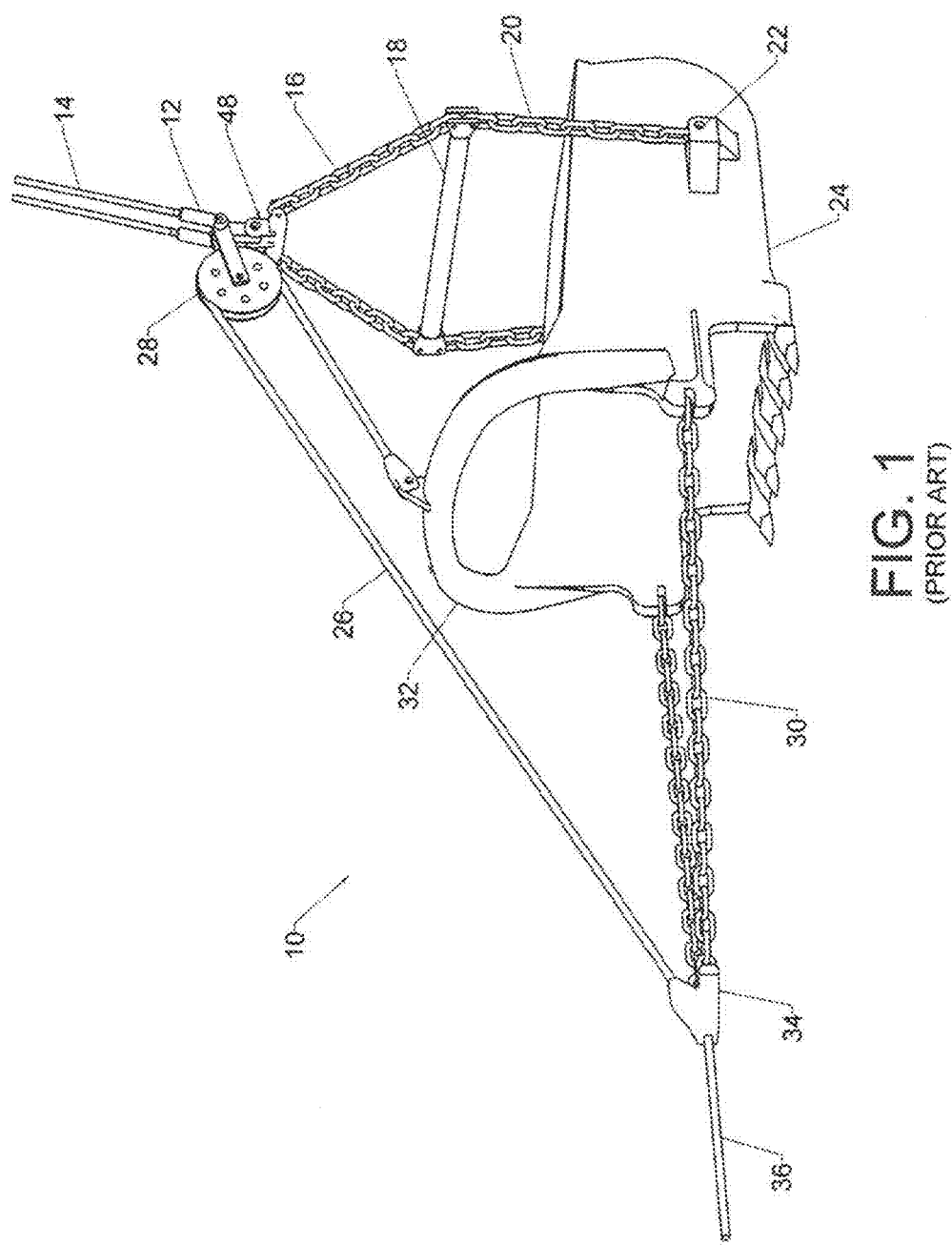
FIG. 1 is a perspective view, showing a prior art dragline bucket assembly.
Figure 2:
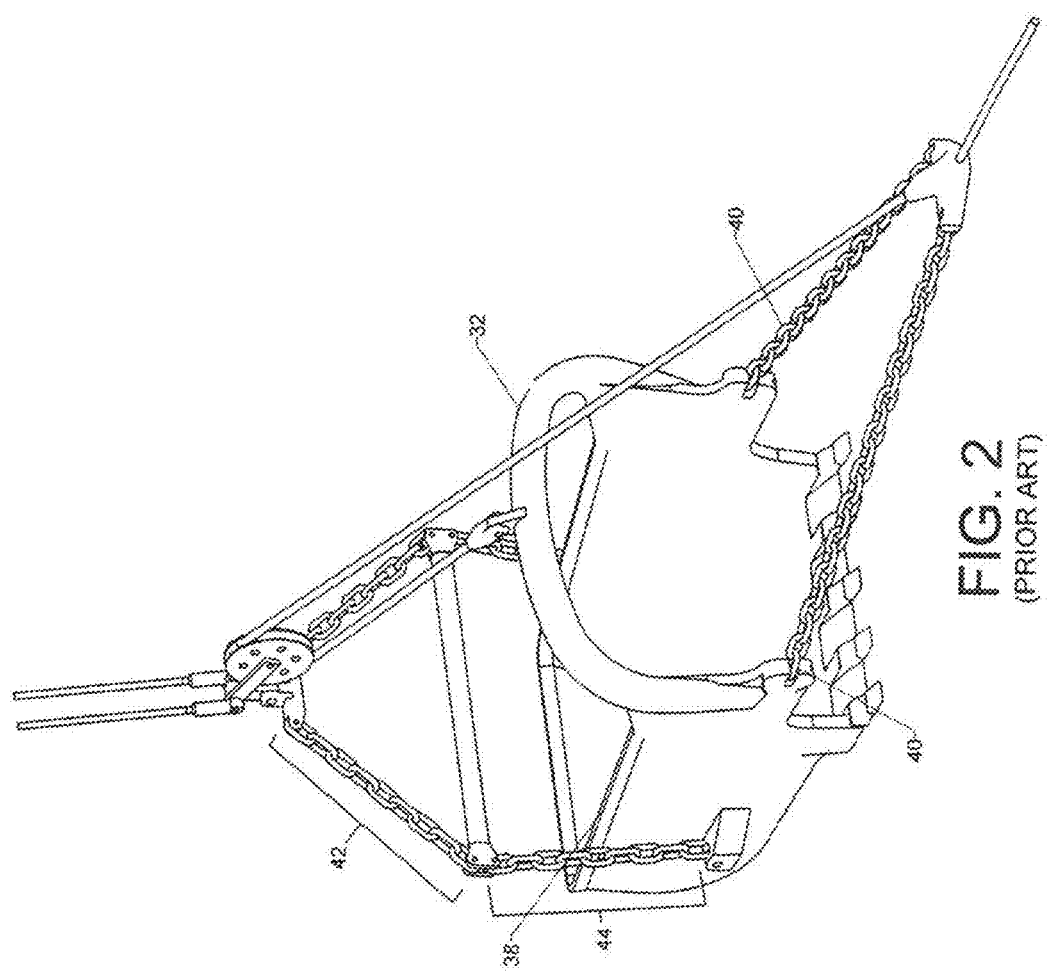
FIG. 2 is a perspective view, showing the assembly of FIG. 1 from another vantage point.
Figure 3:
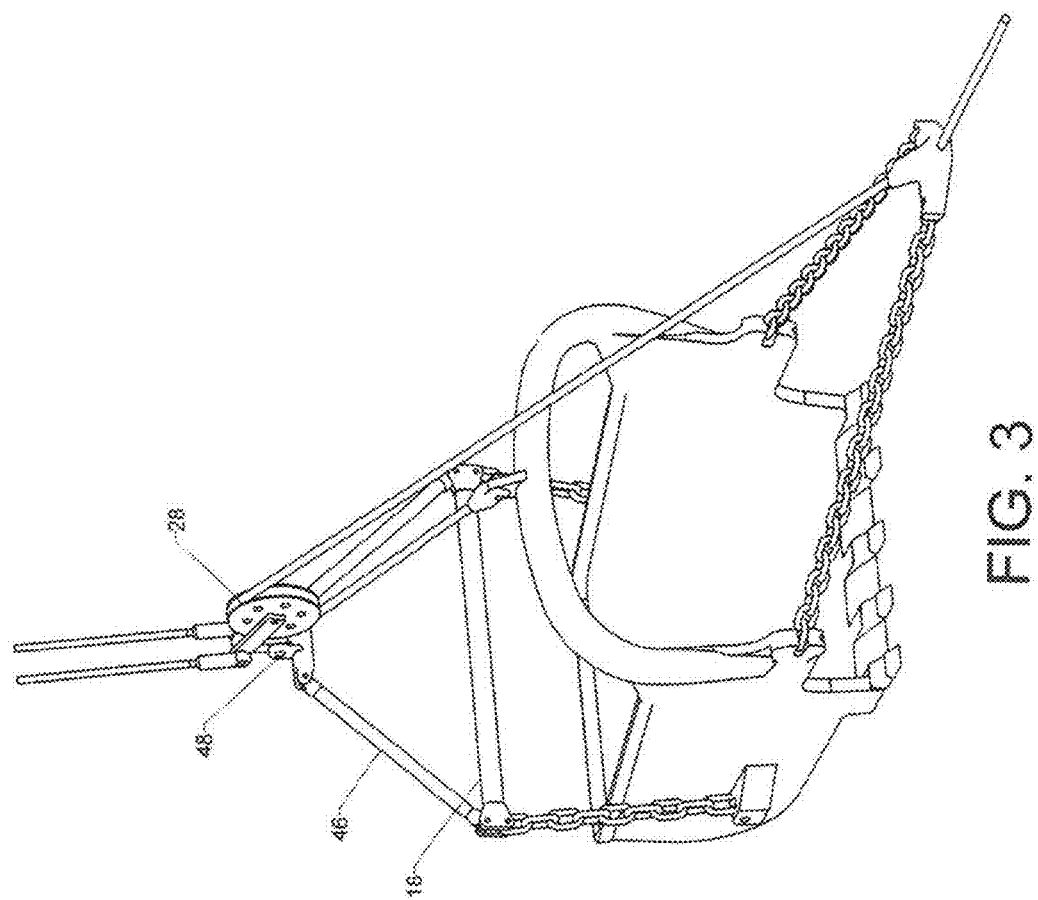
FIG. 3 is a perspective view, showing a dragline bucket assembly using flexible tensile members as part of the upper hoist assembly.
Figure 4:
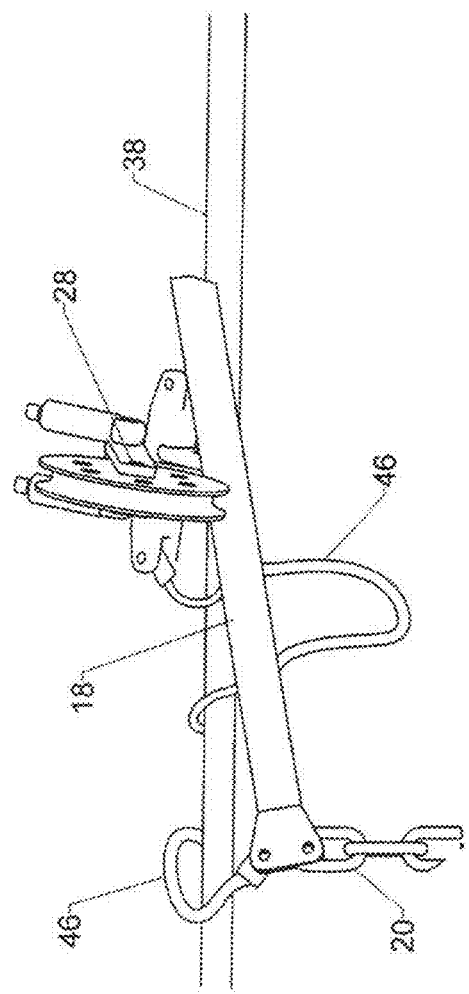
FIG. 4 is a detailed perspective view, showing the assembly of FIG. 3 after the lifting tension is removed from the bucket assembly.
Figure 5:
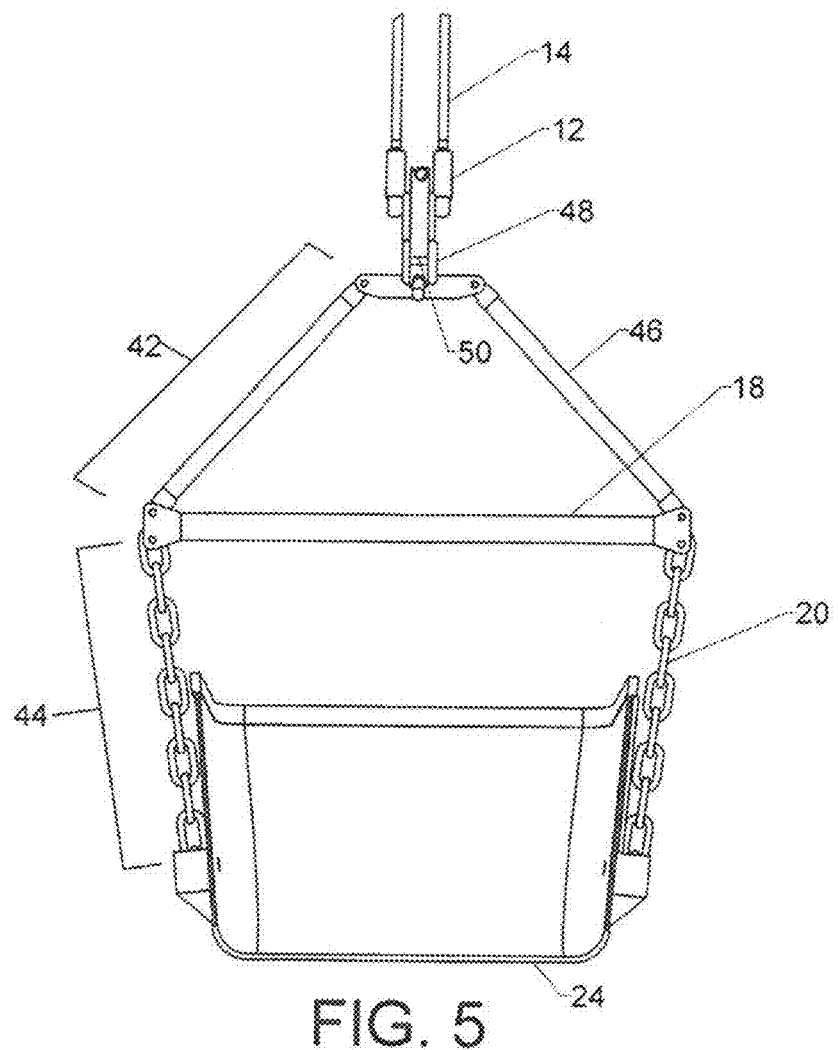
FIG. 5 is a sectional elevation view, showing the assembly of FIG. 3.

The existence of a low-friction interface between the outward-facing surface of the stranded core and the inward-facing surface of the armor layer is an important feature of the invention. In normal dragline operations the bucket will be "dropped" onto the overburden at the start of a new scraping/loading cycle. Looking at FIG. 3, the lifting ropes will not go entirely slack when the bucket is placed down on the overburden but both the upper hoist rigging (above spreader bar 18) and the lower hoist rigging will lose tension and the entire assembly will sag somewhat before the drag line starts to pull the bucket forward. Once the drag portion of the cycle begins the upper hoist rigging will tend to come under tension again.

Tensile member 46 will not necessarily go slack in every cycle but the tension placed on the tensile member will certainly vary. It is important for the reader to realize that the tensile members 46 are constantly moving and the load placed on these elements cycles frequently. If any significant friction exists between the stranded core and the armor layer substantial wear will be produced by the constant motion and fluctuations in loading. There should be no bond at all between these elements. A substantial gap between the elements is even more desirable.

In the example provided previously, the outward-facing surface of the stranded core (or jacket overlying the stranded core if one is present) has a diameter of 5 inches (12.7 cm). The inward-facing surface of the armor layer has a diameter of 6 inches (15.2 cm). The gap is therefore nominally 0.5 inches (1.3 cm).

Some compressive stiffness is desirable in armor layer 56 to maintain the gap. Armor layer 56 is essentially a hollow cylinder. The total length of a tensile member 46 used in the upper hoist rigging ranges from about 3 meters to 8 meters. The armor layer is just shorter than the overall length. An average armor layer is then a hollow cylinder 5 meters long with a wall thickness of 2 inches (5 cm). It is preferably made from a tough natural or synthetic rubber. It is preferably reinforced with fibers for added stiffness. The reinforcing fibers may be steel strands, glass strands, or some other suitable material.

For a tough and flexible material (such as used in the armor layer) the resistance to buckling will largely be a function of wall thickness in comparison to the overall diameter. In the example given, the overall diameter of the armor layer is 20.3 cm. The wall thickness is 5.1 cm. If one considers a transverse cross section (perpendicular to the central axis of the cylinder) the cross sectional area of the 20.3 cm diameter circle is 324 square centimeters. The cross sectional area of the wall itself is 141 square centimeters. One can define a ratio of the wall cross sectional area to the area of the circle defined by the overall outer diameter (20.3 cm in this case). That ratio for this example is 43.5%. In order to maintain enough stiffness to minimize contact between the armor layer and the stranded core, it is preferable to have this ratio exceed 25% and even more preferable to have it exceed 40%. Thus, the reader will appreciate that the armor layer will be a thick-walled cylinder.

Although the preceding description contains significant detail, it should not be construed as limiting the scope of the invention but rather as providing illustrations of the preferred embodiments of the invention. Thus, the language used in the claims shall define the invention rather than the specific embodiments provided.

Having described my invention, I claim:

1. A dragline bucket assembly, comprising:
   (a) a bucket having a first lateral side and a second lateral side;
   (b) a spreader bar having a first end and a second end;
   (c) a first lower tensile member connecting said first lateral side of said bucket to said first end of said spreader bar;
   (d) a second lower tensile member connecting said second lateral side of said bucket to said second end of said spreader bar;
   (e) a yoke;
   (f) a first upper tensile member connecting said first end of said spreader bar to said yoke;
   (g) a second upper tensile member connecting said second end of said spreader bar to said yoke;
   (h) wherein said first upper tensile member includes,
      (i) a flexible stranded core, having a first end, a second end, and a stranded core outer diameter,
      (ii) an armor layer, having a first end, a second end, an inner armor layer diameter, an outer armor layer diameter, and an armor layer cross sectional area,
      (iii) wherein said armor layer inner diameter is substantially greater than said stranded core outer diameter,
      (iv) wherein said armor layer cross sectional area is at least 25% of an area of a circle having a diameter equal to said outer armor layer diameter,
      (v) a first anchor connected to said first end of said stranded core by a first potted region,
      (vi) a second anchor connected to said second end of said stranded core by a second potted region,
      (vii) wherein said first end of said armor layer is connected to said first anchor by a first armor layer connection that is separate from said first potted region, and
      (viii) wherein said second end of said armor layer is connected to said second anchor by a second armor layer connection that is separate from said second potted region.

2. The dragline bucket assembly as recited in claim 1, wherein:
(a) said first anchor includes a first collar extending inside said first end of said armor layer;
(b) said first end of said armor layer is connected to said first collar;
(c) said second anchor includes a second collar extending inside said second end of said armor layer, and
(d) said second end of said armor layer is connected to said second collar, said upper tensile members includes a plurality of synthetic strands, with a termination being attached to each end of said plurality of synthetic strands.

3. The dragline bucket assembly as recited in claim 2, wherein:
(a) said first end of said armor layer is connected to said first collar by a first plurality of bolts; and
(b) said second end of said armor layer is connected to said second collar by a second plurality of bolts.

4. The dragline bucket assembly as recited in claim 1, wherein:
(a) said first anchor is connected to said yoke by a first connecting fixture; and
(b) said second anchor is connected to said spreader bar by a second connecting fixture.

5. The dragline bucket assembly as recited in claim 2, wherein:
(a) said first anchor is connected to said yoke by a first connecting fixture; and
(b) said second anchor is connected to said spreader bar by a second connecting fixture.

6. The dragline bucket assembly as recited in claim 3, wherein:
(a) said first anchor is connected to said yoke by a first connecting fixture; and
(b) said second anchor is connected to said spreader bar by a second connecting fixture.

7. The dragline bucket assembly as recited in claim 1, wherein said armor layer is made of rubber.

8. The dragline bucket assembly as recited in claim 2, wherein said armor layer is made of rubber.

9. A dragline bucket assembly, comprising:
(a) a bucket having a first lateral side and a second lateral side;
(b) a spreader bar having a first end and a second end;
(c) a first lower tensile member connecting said first lateral side of said bucket to said first end of said spreader bar;
(d) a second lower tensile member connecting said second lateral side of said bucket to said second end of said spreader bar;
(e) a yoke;
(f) a first upper tensile member connecting said first end of said spreader bar to said yoke;
(g) a second upper tensile member connecting said second end of said spreader bar to said yoke;
(h) wherein said first upper tensile member includes,
  (i) a flexible stranded core, having a first end, a second end, and a stranded core outer diameter,
  (ii) an armor layer, having a first end, a second end, an inner armor layer diameter, an outer armor layer diameter, and an armor layer cross sectional area,
  (iii) wherein said armor layer cross sectional area is at least 25% of an area of a circle having a diameter equal to said outer armor layer diameter,
  (iv) a first anchor connected to said first end of said stranded core by a first potted region,
  (v) a second anchor connected to said second end of said stranded core by a second potted region,
  (vi) wherein said first end of said armor layer is connected to said first anchor by a first armor layer connection that is separate from said first potted region, and
  (vii) wherein said second end of said armor layer is connected to said second anchor by a second armor layer connection that is separate from said second potted region.

10. The dragline bucket assembly as recited in claim 9, wherein:
(a) said first anchor includes a first collar extending inside said first end of said armor layer;
(b) said first end of said armor layer is connected to said first collar;
(c) said second anchor includes a second collar extending inside said second end of said armor layer, and
(d) said second end of said armor layer is connected to said second collar.

11. The dragline bucket assembly as recited in claim 10, wherein:
(a) said first end of said armor layer is connected to said first collar by a first plurality of bolts; and
(b) said second end of said armor layer is connected to said second collar by a second plurality of bolts.

12. The dragline bucket assembly as recited in claim 9, wherein:
(a) said first anchor is connected to said yoke by a first connecting fixture; and
(b) said second anchor is connected to said spreader bar by a second connecting fixture.

13. The dragline bucket assembly as recited in claim 10, wherein:
(a) said first anchor is connected to said yoke by a first connecting fixture; and
(b) said second anchor is connected to said spreader bar by a second connecting fixture.

14. The dragline bucket assembly as recited in claim 11, wherein:
(a) said first anchor is connected to said yoke by a first connecting fixture; and
(b) said second anchor is connected to said spreader bar by a second connecting fixture.

15. The dragline bucket assembly as recited in claim 9, wherein said armor layer is made of rubber.

16. The dragline bucket assembly as recited in claim 10, further comprising a second upper tensile member connecting said second end of said spreader bar to said yoke.

* * * * *